(12) United States Patent
Tomiyama

(10) Patent No.: US 10,637,969 B2
(45) Date of Patent: Apr. 28, 2020

(54) DATA TRANSMISSION METHOD AND DATA TRANSMISSION DEVICE

(71) Applicant: FUJITSU LIMITED, Kawasaki-shi, Kanagawa (JP)

(72) Inventor: Yoshihide Tomiyama, Kobe (JP)

(73) Assignee: FUJITSU LIMITED, Kawasaki (JP)

( * ) Notice: Subject to any disclaimer, the term of this patent is extended or adjusted under 35 U.S.C. 154(b) by 64 days.

(21) Appl. No.: 16/140,763

(22) Filed: Sep. 25, 2018

(65) Prior Publication Data
US 2019/0028571 A1 Jan. 24, 2019

Related U.S. Application Data

(63) Continuation of application No. PCT/JP2016/060845, filed on Mar. 31, 2016.

(51) Int. Cl.
| | |
|---|---|
| *H04L 29/06* | (2006.01) |
| *G06F 13/00* | (2006.01) |
| *G06F 16/901* | (2019.01) |

(52) U.S. Cl.
CPC .............. *H04L 69/04* (2013.01); *G06F 13/00* (2013.01); *H04L 69/163* (2013.01); *H04L 69/166* (2013.01); *G06F 16/9014* (2019.01)

(58) Field of Classification Search
CPC ........................................................ H04L 69/04
USPC ........................................................ 709/247
See application file for complete search history.

(56) References Cited

U.S. PATENT DOCUMENTS

| | | | | |
|---|---|---|---|---|
| 7,451,237 | B2* | 11/2008 | Takekawa ............... | H04L 69/04 382/239 |
| 7,619,545 | B2* | 11/2009 | Samuels ............. | H03M 7/3084 341/51 |
| 7,693,814 | B2* | 4/2010 | Margolus ............ | G06F 21/6272 713/165 |
| 7,827,237 | B2* | 11/2010 | Plamondon ............. | H04L 69/04 341/87 |

(Continued)

FOREIGN PATENT DOCUMENTS

| | | | |
|---|---|---|---|
| CN | 102469142 A | | 5/2012 |
| JP | 5-145437 A | | 6/1993 |

(Continued)

OTHER PUBLICATIONS

Deligiannakis et al., "Compressing Historical Information in Sensor Networks", 2004 (Year: 2004).*

(Continued)

*Primary Examiner* — Ondrej C Vostal
(74) *Attorney, Agent, or Firm* — Westerman, Hattori, Daniels & Adrian, LLP

(57) ABSTRACT

A data optimization unit divides data of a TCP application into chunks. Then, the data optimization unit calculates a hash value with respect to the chunk, and searches a hash information storage unit from the hash value and a data size of the chunk, and thus, determines duplication of the chunk. Then, in a case where there is no duplication of the chunk, the data optimization unit stores the chunk, and stores the hash value, the data size of the chunk, and the position of the chunk in a hash information storage unit. Then, the data optimization unit compresses the chunk, and transmits compressed data to a transport optimization unit.

7 Claims, 12 Drawing Sheets

(56) References Cited

U.S. PATENT DOCUMENTS

| | | | |
|---|---|---|---|
| 2003/0110296 A1* | 6/2003 | Kirsch | H04L 29/06 709/246 |
| 2003/0208693 A1* | 11/2003 | Yoshida | H04L 29/06 726/26 |
| 2003/0224734 A1 | 12/2003 | Takekawa et al. | |
| 2006/0179159 A1* | 8/2006 | Rosenau | H04L 47/365 709/247 |
| 2008/0104269 A1* | 5/2008 | Vitanov | G06F 16/9574 709/236 |
| 2008/0224906 A1* | 9/2008 | Plamondon | H03M 7/30 341/76 |
| 2012/0233117 A1* | 9/2012 | Holt | H04L 67/06 707/620 |
| 2013/0141259 A1* | 6/2013 | Hazarika | H03M 7/3059 341/106 |
| 2013/0301430 A1* | 11/2013 | Pamu | H04L 69/04 370/252 |
| 2014/0119377 A1* | 5/2014 | Crosta | H04L 69/04 370/392 |
| 2014/0223029 A1* | 8/2014 | Bhaskar | H03M 7/3088 709/247 |
| 2014/0330894 A1* | 11/2014 | Zhao | H04L 67/10 709/203 |
| 2015/0091738 A1* | 4/2015 | Wedemeyer | E21B 47/09 340/854.1 |
| 2015/0156136 A1* | 6/2015 | Holt | H04L 67/1095 709/225 |
| 2017/0250886 A1* | 8/2017 | Leitner | H04L 43/0894 |
| 2018/0034784 A1* | 2/2018 | Sinclair | H04L 9/0869 |

FOREIGN PATENT DOCUMENTS

| | | |
|---|---|---|
| JP | 2003-338761 A | 11/2003 |
| JP | 2010-020416 A | 1/2010 |
| JP | 2013-200713 A | 10/2013 |
| WO | 2015/132885 A1 | 9/2015 |

OTHER PUBLICATIONS

Office Action dated Jul. 30, 2019, issued in counterpart JP Application No. 2018-508320, with English translation (6 pages).
International Search Report dated Jun. 7, 2016, issued in counterpart International Application No. PCT/JP2016/060845, with English Translation. (5 pages).

* cited by examiner

FIG.3

| COMPRESSION SWITCHING FLAG | TRUE |
|---|---|

FIG.5

| AVERAGE PROCESSING TIME | INTEGER [ms] |
|---|---|
| NUMBER OF OCCURRENCE TIMES OF WASTE | INTEGER [TIMES] |
| THRESHOLD VALUE | INTEGER |

FIG.6

| HASH VALUE | CHARACTER STRING |
|---|---|
| DATA SIZE | INTEGER [BYTES] |
| DATA POSITION | INTEGER |

FIG.7

| $DATA_1$ | $DATA_2$ |
|---|---|
| $DATA_3$ | ... |
| ... | $DATA_N$ |

DATA TRANSMISSION METHOD AND DATA TRANSMISSION DEVICE

CROSS-REFERENCE TO RELATED APPLICATION(S)

This application is a continuation of International Application No. PCT/JP2016/060845, filed on Mar. 31, 2016, the entire contents of which are incorporated herein by reference.

FIELD

The embodiment discussed herein is related to a data transmission method and a data transmission device.

BACKGROUND

In order to reduce a data amount, there is a technology in which data is transmitted by being compressed on a transmission side, and is restored by being decompressed on a reception side, in the case of transferring the data. In addition, there is a technology in which a transmission time in the case of performing compression processing with respect to the data, and a transmission time in the case of not performing the compression processing with respect to the data are predicted, and it is determined whether the data is transmitted by being compressed or is transmitted without being compressed, on the basis of the predicted transmission time, and thus, the transmission time is reduced.

Patent Literature 1: Japanese Laid-open Patent Publication No. 5-145437

However, in a case where there is duplication in the data, the transmission time is not sufficiently reduced only by predicting the transmission time, and by determining whether the data is transmitted by being compressed or is transmitted without being compressed. In a case where there is the duplication in the data, it is possible to decrease the data amount by setting the duplicate data not to be transmitted as it is. In addition, it is possible to suppress a processing load due to data compression by not performing the compression processing.

SUMMARY

According to an aspect of an embodiment, a computer-readable recording medium having stored therein a program that causes a computer to execute a process including, dividing acquired first data to generate second data having a size smaller than a size of the first data, determining whether or not the generated second data has been transmitted, with reference to a storage unit storing identification information of transmitted data, compressing the second data to generate third data having a size smaller than the size of the second data in a case in which the second data has not been transmitted, and transmitting the generated third data to a designated information processing device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an example of a switching information storage unit;

FIG. 5 is a diagram illustrating an example of items which are stored in an effect determination information storage unit;

FIG. 6 is a diagram illustrating an example of items which are stored for each chunk in the hash information storage unit;

FIG. 7 is a diagram illustrating an example of a chunk storage unit;

DESCRIPTION OF EMBODIMENT

A preferred embodiment of the present invention will be explained with reference to accompanying drawings. The embodiment does not limit the disclosed technology.

Figure 1:
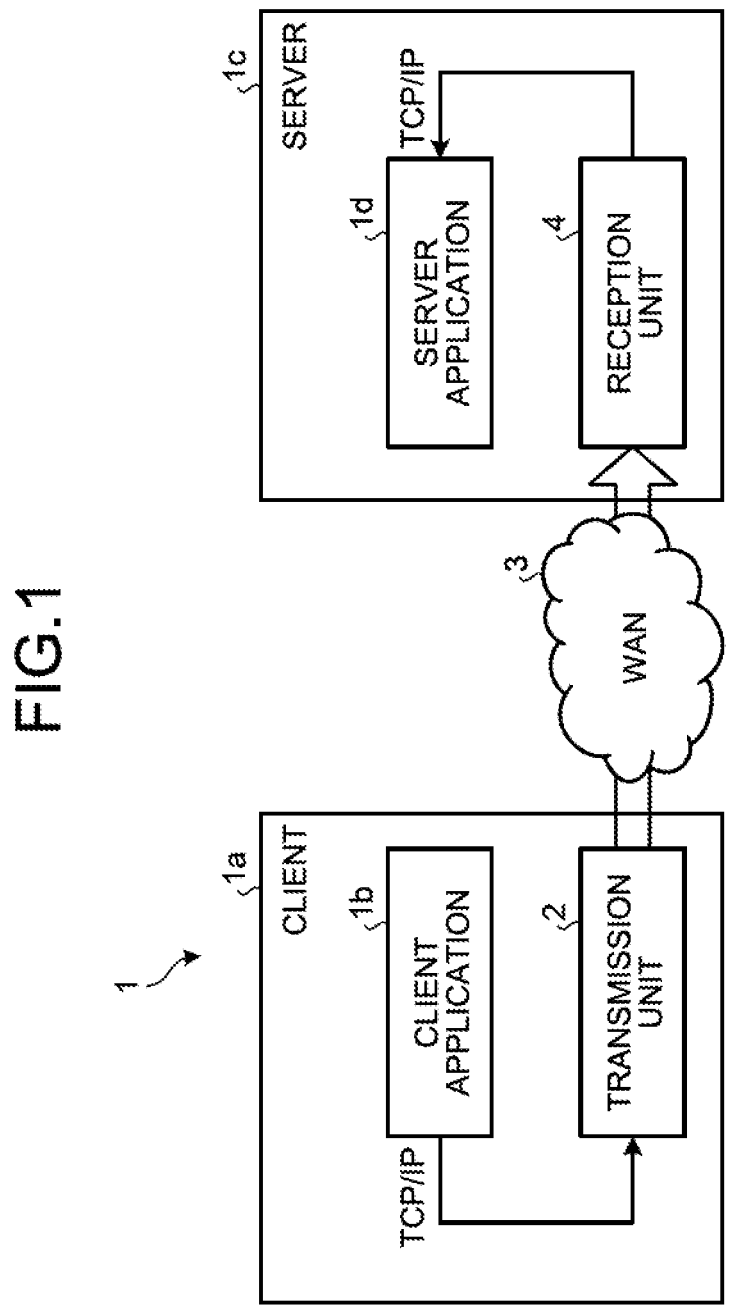
FIG. 1 is a diagram for illustrating a data transfer system according to an embodiment.

First, a data transfer system according to an embodiment will be described. FIG. 1 is a diagram for illustrating the data transfer system of the embodiment. As illustrated in FIG. 1, a data transfer system 1 transfers data which is transmitted by a client application 1b operated in a client 1a to a server application 1d operated in a server 1c through a wide area network (WAN) 3. The client application 1b transfers data to the server application 1d by using transmission control protocol (TCP)/internet protocol (IP).

The data transfer system 1 includes a transmission unit 2 and a reception unit 4. The transmission unit 2 is operated in the client 1a, receives data from the client application 1b, and transmits the data to the server 1c through the WAN 3. The reception unit 4 is operated in the server 1c, receives the data transmitted by the transmission unit 2, and transmits the data to the server application 1d. The transmission unit 2 may be operated in a device different from the client 1a, and the reception unit 4 may be operated in a device different from the server 1c.

The data transfer system 1 may transfer data which is transmitted by the server application 1d operated in the server 1c to the client application 1b operated in the client 1a through the WAN 3. In this case, the transmission unit 2 is operated in the server 1c, and the reception unit 4 is operated in the client 1a.

The transmission unit 2 divides the data into chunks of 1 to 4 kilobytes (KB), and in a case where there is a duplicate chunk, an index corresponding to the chunk is transmitted instead of the chunk, and in a case where there is no duplication, the chunk is transmitted by being compressed.

The reception unit 4 restores the duplicate chunk, and decompresses the compressed chunk.

Thus, in the data transfer system 1, only in a case where there is no duplicate chunk, the transmission unit 2 transmits the chunk by compressing the chunk, and thus, it is possible to suppress a processing load due to data compression.

Figure 2:
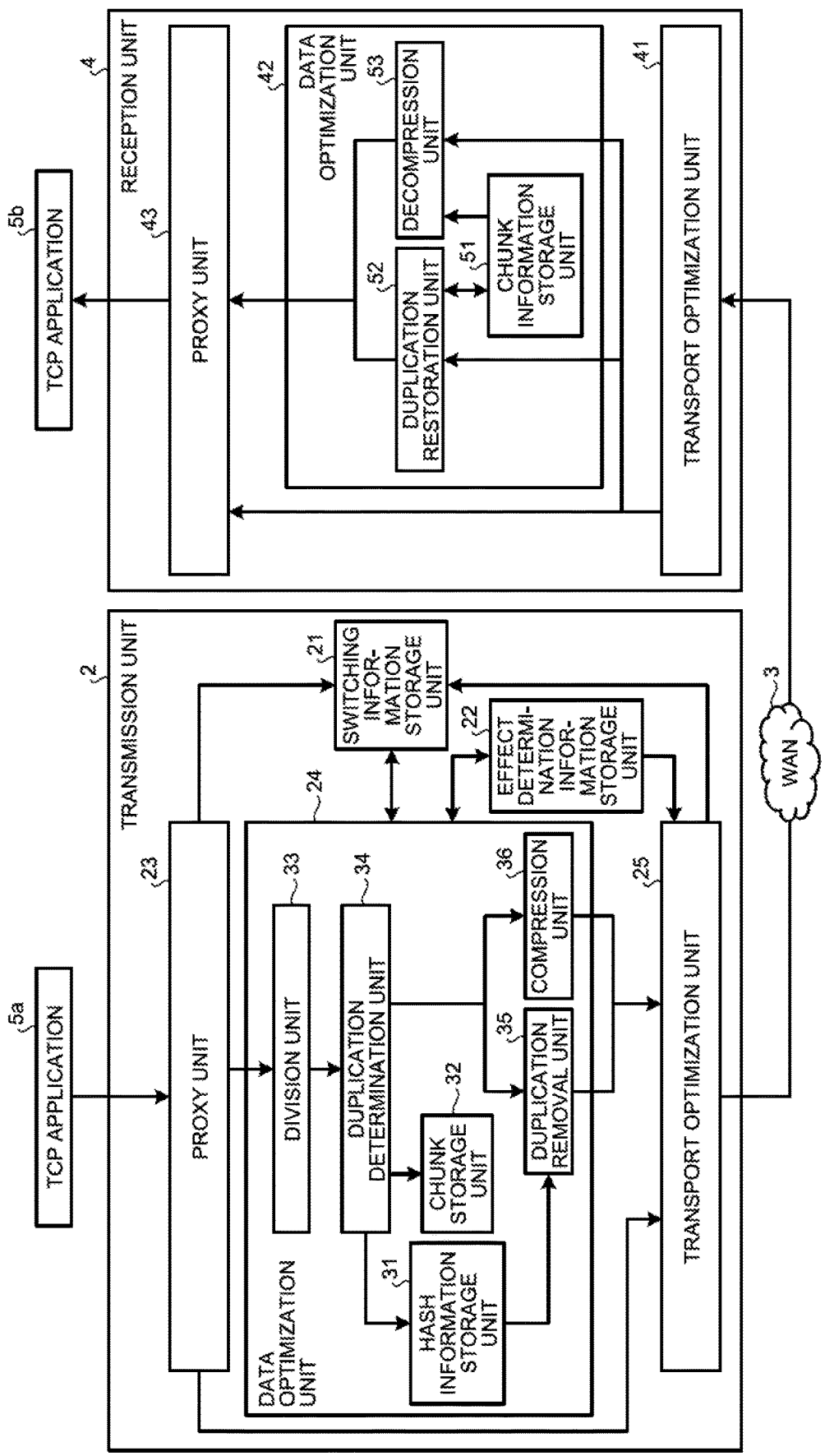
FIG. 2 is a diagram illustrating a functional configuration of the data transfer system.

Next, a functional configuration of the data transfer system 1 will be described. FIG. 2 is a diagram illustrating the functional configuration of the data transfer system 1. As illustrated in FIG. 2, the data transfer system 1 includes the transmission unit 2 and the reception unit 4. The transmission unit 2 and the reception unit 4 are connected to each other through the WAN 3.

Figure 3:
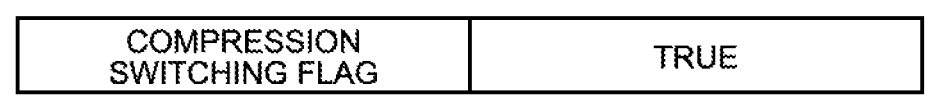

The transmission unit 2 includes a switching information storage unit 21, an effect determination information storage unit 22, a proxy unit 23, a data optimization unit 24, and a transport optimization unit 25. The switching information storage unit 21 stores compression switching information indicating whether or not to perform compression. FIG. 3 is a diagram illustrating an example of the switching information storage unit 21. As illustrated in FIG. 3, the switching information storage unit 21 stores a compression switching flag. In a case where the compression switching flag is true, the compression is performed, and in a case where the compression switching flag is false, the compression is not performed.

An initial value of the compression switching flag is true. The compression switching flag is updated by the proxy unit 23, the data optimization unit 24, and the transport optimization unit 25, and is used for determining whether or not to perform the compression in the data optimization unit 24.

Figure 4A:
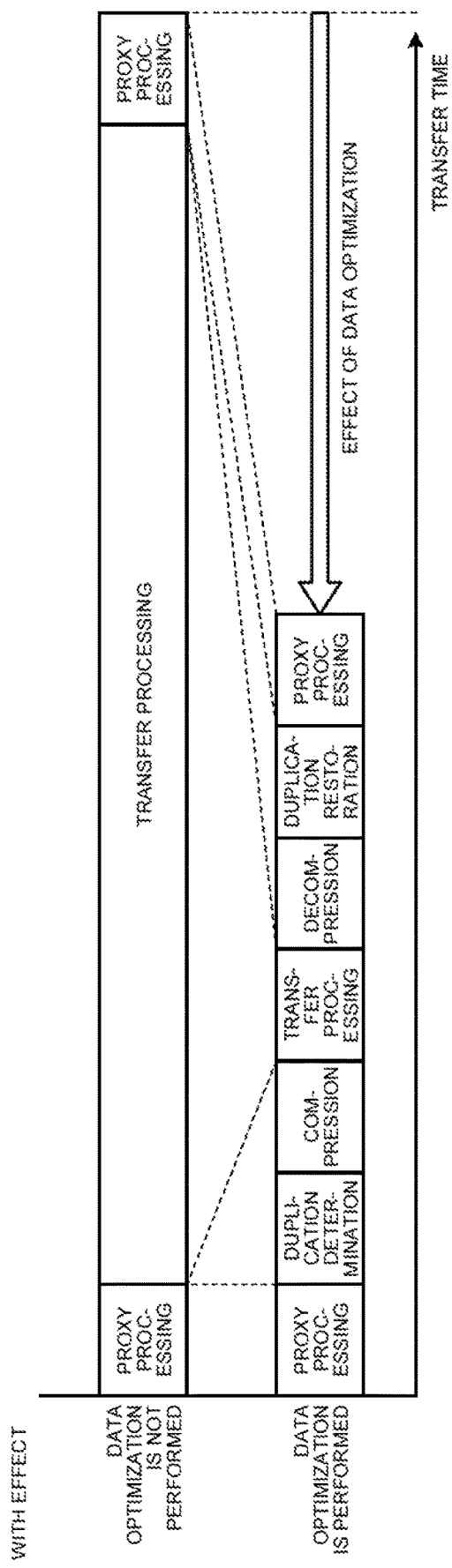
FIGS. 4A and 4B are diagrams for illustrating a speed-up effect of data optimization according to duplication removal and compression of a chunk.
Figure 4B:
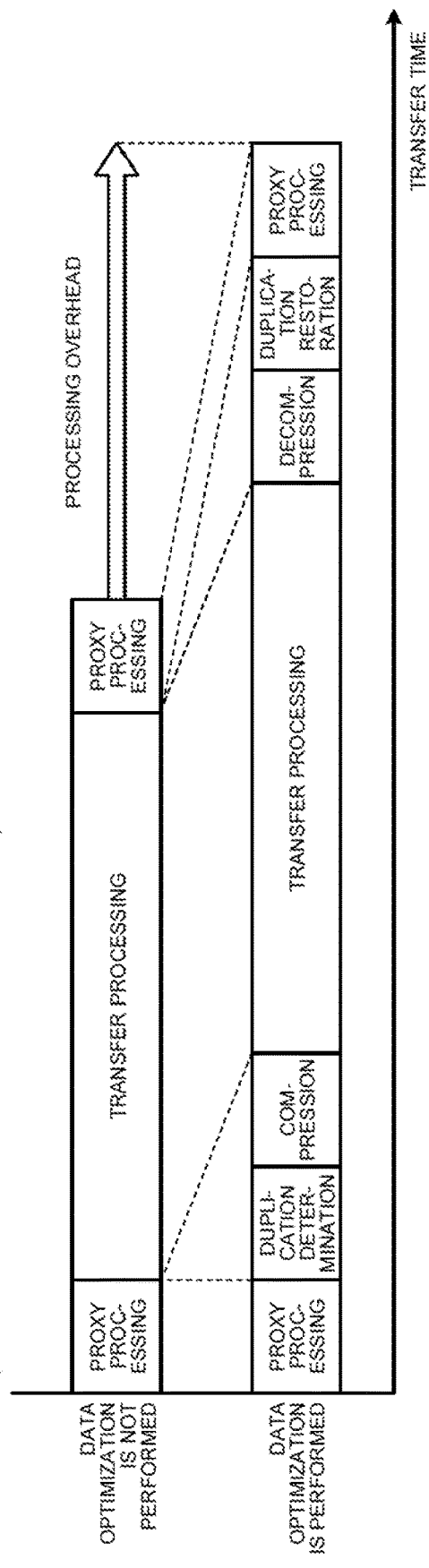

The effect determination information storage unit 22 stores information for determining whether or not there is an effect of the data compression. FIGS. 4A and 4B are diagrams for illustrating the effect of the data compression. In FIGS. 4A and 4B, data optimization indicates duplication removal and compression of a chunk. FIG. 4A illustrates a case where there is an effect, and FIG. 4B illustrates a case where there is no effect.

As illustrated in FIG. 4A, in a case where the size of transfer data can be reduced by the data optimization, a time for performing transfer processing of the data is reduced. For this reason, even in the case of including overhead of duplication determination, compression, decompression, and duplication restoration for performing the data optimization, it is possible to reduce a transfer time.

On the other hand, as illustrated in FIG. 4B, in a case where the size of the transfer data is not capable of being reduced by the data optimization, the overhead for the data optimization increases without changing the time for performing the transfer processing with respect to the data, and thus, the transfer time is prolonged. For example, in a case where the transfer data is compressed data, it is not possible to reduce the size by the data compression, and thus, there is no effect of the data optimization.

FIG. 5 is a diagram illustrating an example of items which are stored in the effect determination information storage unit 22. As illustrated in FIG. 5, the effect determination information storage unit 22 stores an average processing time, the number of occurrence times of waste, and a threshold value. The average processing time is an average value of the processing time for performing the compression processing, and the unit is millisecond (ms). The number of occurrence times of waste is the number of times when the waste occurs by considering a case where a data size after the compression is larger than or equal to a data size before the compression, as the waste.

The threshold value is a predetermined value for determining the effect. Average Processing Time×Number of Occurrence Times of Waste is used for determining the effect. That is, in the case of Average Processing Time×Number of Occurrence Times of Waste>Threshold Value, it is determined that there is no compression effect, and the compression switching flag is set to false such that the compression processing is not performed. The reason for multiplying the number of occurrence times of waste and the average processing time together, is to reflect a difference in the processing time according to a machine on the determination.

Returning to FIG. 2, the proxy unit 23 receives TCP data from a TCP application 5a performing communication by using a TCP, and determines the size of the received TCP data. As a result thereof, a case where the size is 0, is a case of detecting a point at which the communication from the TCP application 5a is broken, and thus, there is a possibility that a data type is changed to data having a compression effect, and therefore, the proxy unit 23 sets the compression switching flag to true.

In addition, in a case where the size of the TCP data is not 0, the proxy unit 23 determines the definition of the data optimization, and in the case of data optimization ON, the data is transmitted to the data optimization unit 24, and in the case of data optimization OFF, the data is transmitted to the transport optimization unit 25. Here, the definition of the data optimization is information of designating whether or not a user performs the data optimization, and in a case where the data optimization ON is designated, the data optimization is performed, and in a case where the data optimization OFF is designated, the data optimization is not performed.

The data optimization unit 24 divides the data into the chunks, and performs the duplication removal of the chunk. In addition, in a case where the compression switching flag is true, the data optimization unit 24 performs the compression of the chunk. The data optimization unit 24 includes a hash information storage unit 31, a chunk storage unit 32, a division unit 33, a duplication determination unit 34, a duplication removal unit 35, and a compression unit 36.

The hash information storage unit 31 stores information relevant to a hash for each of the chunks. FIG. 6 is a diagram illustrating an example of items which are stored in the hash information storage unit 31 for each of the chunks. As illustrated in FIG. 6, the items which are stored in the hash information storage unit 31 for each of the chunks include a hash value, a data size, and a data position.

The hash value is a value which is calculated from the chunk by calculating the hash, and is a character string. The data size is the size of the chunk, and is an integer indicating the number of bytes. The hash information storage unit 31 is searched by the hash value and the data size. The data position indicates the position of the chunk in the chunk storage unit 32. The data position is an offset from a head of the chunk storage unit 32, and is an integer. The hash information storage unit 31 is a region which is allocated in a memory.

The chunk storage unit 32 stores the chunk. FIG. 7 is a diagram illustrating an example of the chunk storage unit 32. As illustrated in FIG. 7, the chunk storage unit 32 stores the actual data of the chunk. In FIG. 7, $data_1$ to $data_N$ are the actual data. The chunk storage unit 32 is realized by a file.

The division unit 33 divides the data received from the proxy unit 23 into the chunks, and transmits the chunks to the duplication determination unit 34. The division unit 33 prepares a block having a variable length of 1 KB to 4 KB as the chunk, by a method referred to as contents defined chunking (CDC), on the basis of the contents of the data.

The duplication determination unit 34 calculates the hash value as a fingerprint of the chunk. Then, the duplication determination unit 34 searches the hash information storage unit 31 by using the hash value and the data size of the chunk, and determines whether or not there is the duplication in the chunk.

Then, in a case where there is no duplication, the duplication determination unit 34 stores the chunk in the chunk storage unit 32, stores the hash value, the data size of the chunk, the data position of the chunk in the chunk storage unit 32, in the hash information storage unit 31, and transmits the chunk to the compression unit 36. In a case where the duplication determination unit 34 determines that there is the duplication, the duplication removal unit 35 changes the chunk into the index based on the hash value and transmits the index to the transport optimization unit 25.

The compression unit 36 sets the compression switching flag by using the information of the effect determination information storage unit 22. Specifically, the compression unit 36 determines whether or not Average Processing Time×Number of Occurrence Times of Waste>Threshold Value is satisfied, and in a case where Average Processing Time×Number of Occurrence Times of Waste>Threshold Value is satisfied, the compression switching flag is set to false, and in a case where Average Processing Time×Number of Occurrence Times of Waste>Threshold Value is not satisfied, the compression switching flag is not updated.

Then, in a case where the compression switching flag is true, the compression unit 36 performs the compression of the chunk. Then, the compression unit 36 measures the time for performing the compression processing, and updates the average processing time in the effect determination information storage unit 22.

Then, in a case where the size of the chunk before the compression is smaller than or equal to the size after the compression, the compression unit 36 updates the number of occurrence times of waste in the effect determination information storage unit 22, and transmits uncompressed data to the transport optimization unit 25. On the other hand, in a case where the size of chunk before the compression is not smaller than or equal to the size after the compression, the compression unit 36 transmits the compressed data to the transport optimization unit 25.

The transport optimization unit 25 optimizes the data which is transmitted from the proxy unit 23 or the data optimization unit 24, in the transport layer, and transmits the data to the reception unit 4 through the WAN 3. The transport optimization unit 25 selects a random packet stream (RPS), a universal network acceleration protocol (UNAP), or a high speed TCP as a protocol, and thus, performs the optimization in the transport layer.

Here, the RPS is a protocol of restoring data by using an error-correcting code in an environment of a high packet disposal efficiency, without performing any retransmission, and is a protocol using a UDP as a base. The UNAP is a protocol of efficiently retransmitting data by determining a disposed packet, and is a protocol using the UDP as a base. The high speed TCP is a protocol obtained by speeding up the TCP.

In addition, the transport optimization unit 25 sets the compression switching flag, on the basis of the average processing time in the effect determination information storage unit 22, a remaining data amount of a communication buffer, and a vacant band of the WAN 3. Specifically, in the case of Average Processing Time<Remaining Data Amount×Vacant Band is satisfied, the transport optimization unit 25 is capable of compressing the remaining data during the transmission, and thus, the compression switching flag is set to true.

Figure 8:
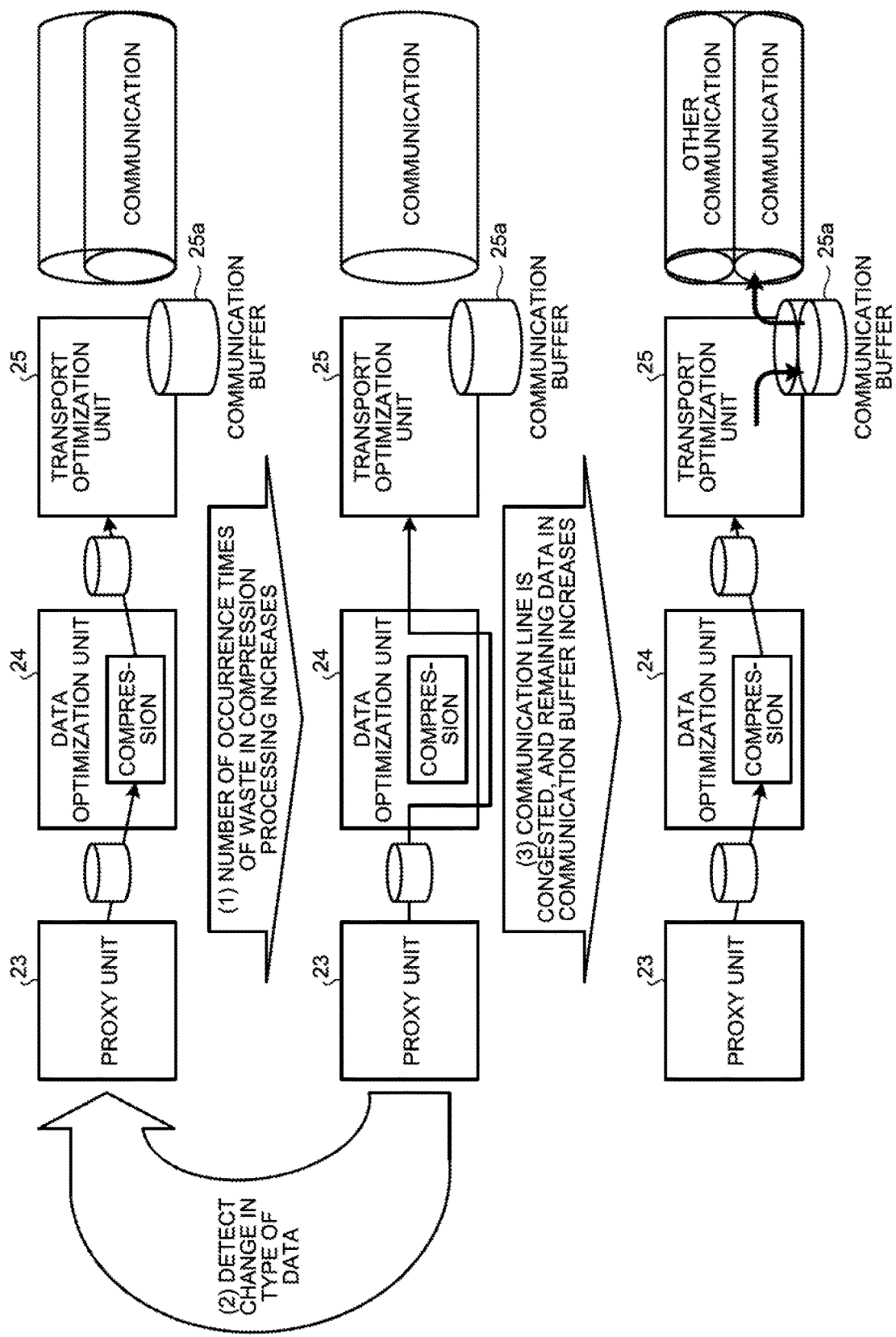
FIG. 8 is a diagram for illustrating switching of compression processing of a transmission unit.

FIG. 8 is a diagram for illustrating switching of the compression processing of the transmission unit 2. As illustrated in FIG. 8, in a case where there is no duplication, the data optimization unit 24 initially transmits the chunk to the transport optimization unit 25 by compressing the chuck. Then, in a case where the number of occurrence times of waste in the compression processing increases (1), the data optimization unit 24 transmits the chunk to the transport optimization unit 25 without compressing the chunk.

After that, in a case where a change in the data type is detected by the fact that the size of the received data is 0 (2), the proxy unit 23 sets again the compression switching flag to true, and the data optimization unit 24 transmits the chunk to the transport optimization unit 25 by compressing the chunk.

In addition, in a case where a communication line is congested, and the remaining data in a communication buffer 25a increases (3), the transport optimization unit 25 sets again the compression switching flag to true. After that, in a case where the remaining data in the communication buffer 25a decreases, the transport optimization unit 25 sets the compression switching flag to false.

Thus, the transmission unit 2 switches the compression switching flag, and thus, is capable of performing effective compression processing.

Returning to FIG. 2, the reception unit 4 includes a transport optimization unit 41, a data optimization unit 42, and a proxy unit 43. The transport optimization unit 41 transmits the data which is received in the RPS, the UNAP, or the high speed TCP, to the data optimization unit 42 or the proxy unit 43.

The data optimization unit 42 performs the restoration or the decompression with respect to the data received from the transport optimization unit 41, as appropriate, generates the TCP data by collecting the chunks, and transmits the TCP data to the proxy unit 43. The proxy unit 43 transmits the TCP data to a TCP application 5b.

The data optimization unit 42 includes a chunk information storage unit 51, a duplication restoration unit 52, and a decompression unit 53. The chunk information storage unit 51 stores the decompressed data in association with the index. The duplication restoration unit 52 restores the duplicate chunk from the index by searching the chunk information storage unit 51. The decompression unit 53 decompresses the compressed data, and stores the decompressed data in the chunk information storage unit 51, along with the index.

Figure 9:
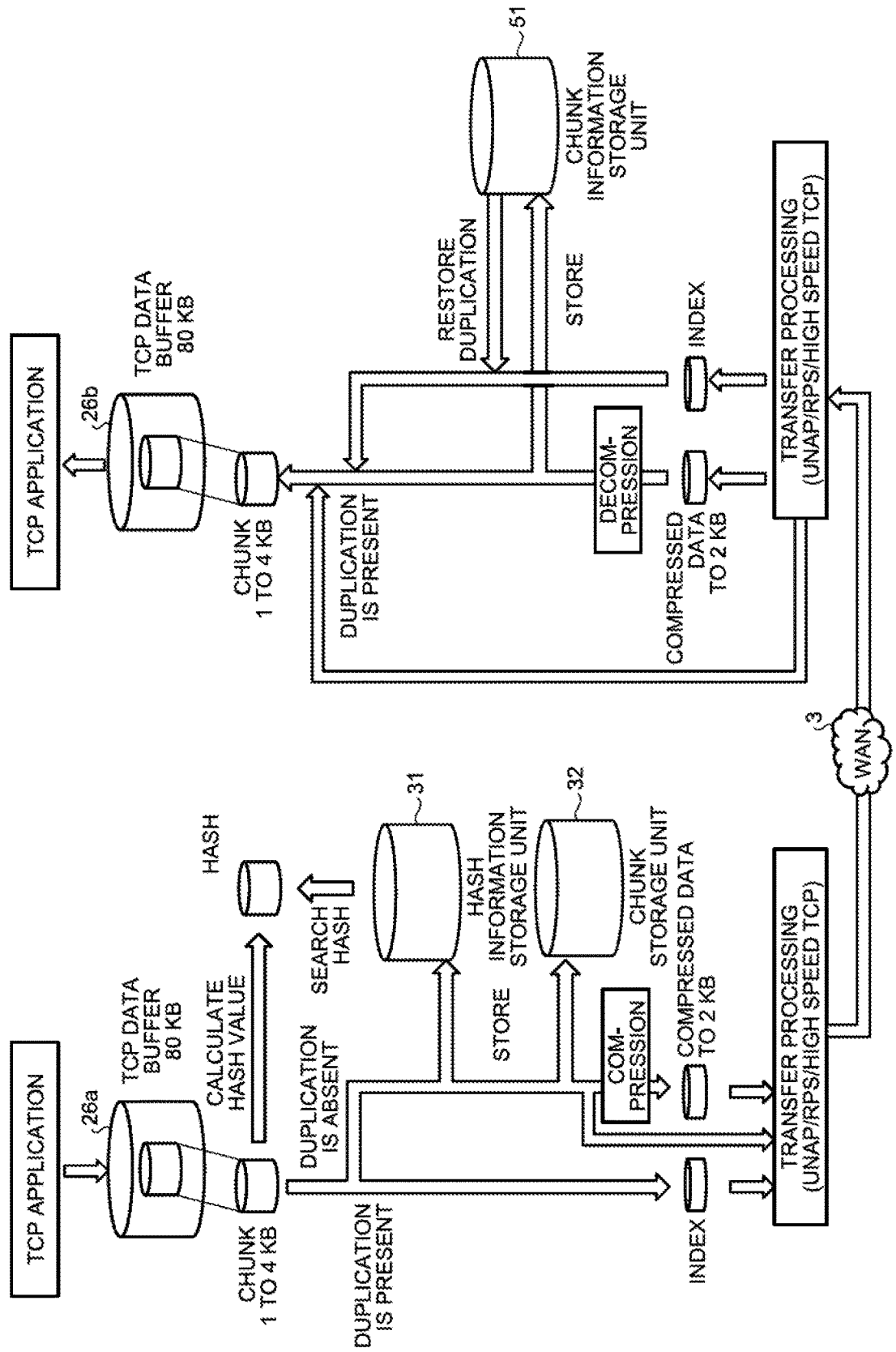
FIG. 9 is a diagram for illustrating processing of a data optimization unit.

FIG. 9 is a diagram for illustrating the processing of the data optimization unit 24 and the data optimization unit 42. The data optimization unit 24 reads out data from a TCP data buffer 26a of 80 KB, and divides the data into chunks of 1 KB to 4 KB. Then, the data optimization unit 24 calculates the hash value of the chunk, and performs hash search with respect to the hash information storage unit 31 by using the hash value and the size of the chunk.

Then, the data optimization unit 24 determines whether or not there is the duplication of the chunk, and in a case where there is the duplication, transfers the index to the transport optimization unit 25. On the other hand, in a case where there is no duplication in the chunk, the data optimization unit 24 stores the chunk of the chunk storage unit 32, and stores the hash value, the data size, and the data position in the hash information storage unit 31.

Then, the data optimization unit 24 determines whether or not to perform the compression, by using the compression switching flag, and in a case where the compression switching flag is true, the chunk is compressed, and is transferred to the transport optimization unit 25. On the other hand, in a case where the compression switching flag is false, the chunk is transferred to the transport optimization unit 25 without being compressed.

Then, in a case where the data is received through the transport optimization unit 41, and the received data is the chunk, the data optimization unit 42 of the reception unit 4 allows the proxy unit 43 to store the chunk in a TCP data buffer 26b.

In addition, in a case where the received data is the compressed data, the data optimization unit 42 decompresses the data, stores the chunk in the chunk information storage unit 51, along with the index, and allows the proxy unit 43 to store the chunk in the TCP data buffer 26b.

In a case where the received data is the index, the data optimization unit 42 searches the chunk information storage unit 51, restores the duplicate chunk, and allows the proxy unit 43 to store the chunk in the TCP data buffer 26b.

Figure 10:
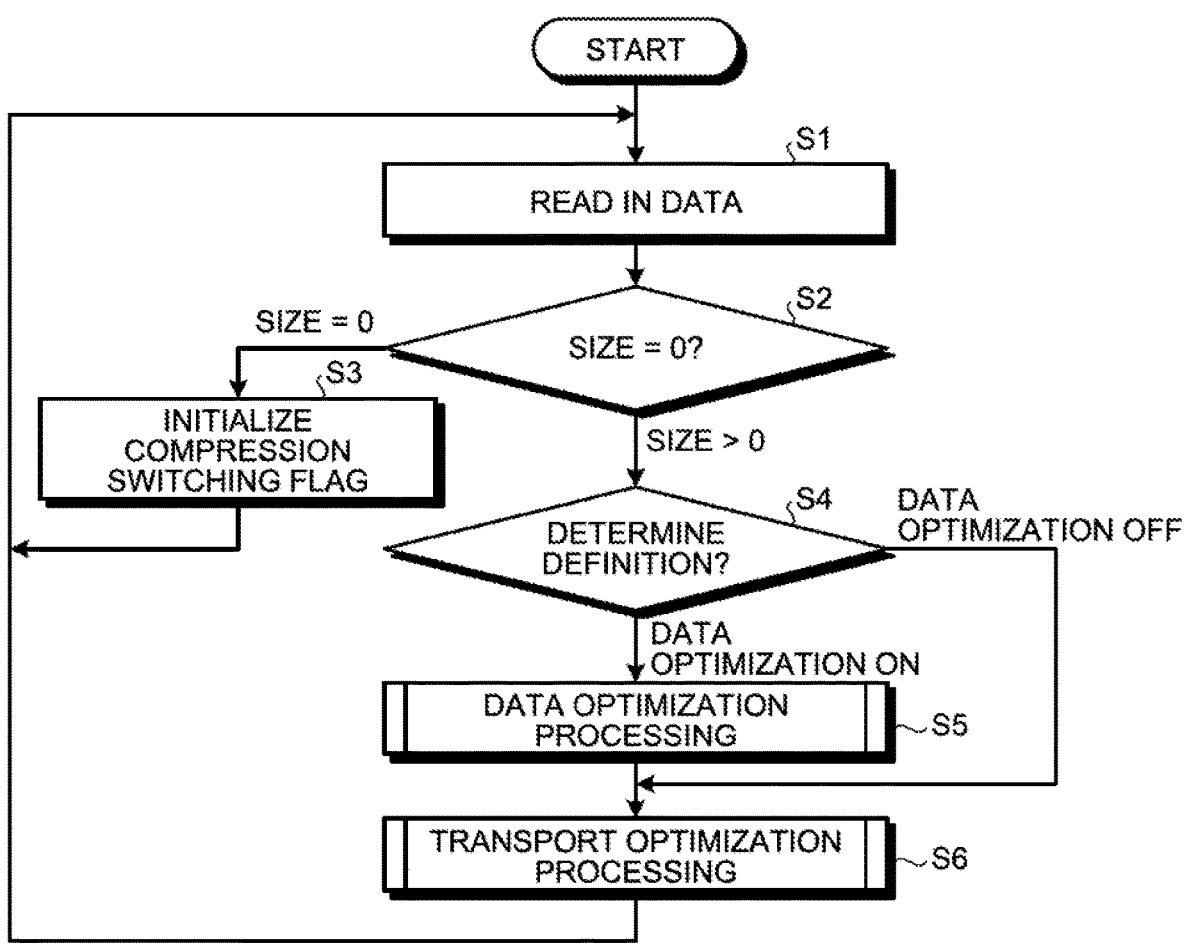
FIG. 10 is a flowchart illustrating a flow of processing of the transmission unit.

Next, a flow of the processing of the transmission unit 2 will be described. FIG. 10 is a flowchart illustrating the flow of the processing of the transmission unit 2. As illustrated in FIG. 10, the transmission unit 2 reads in the data from the TCP data buffer 26a (Step S1), and determines whether or not the size of the received data is 0 (Step S2).

As a result thereof, in a case where the size of the received data is 0, the transmission unit 2 initializes the compression switching flag to true (Step S3), and returns to Step S1. On the other hand, in a case where the size of the received data is not 0, the transmission unit 2 determines the definition of the data optimization (Step S4), and in the case of the data optimization OFF, the transmission unit 2 performs transport optimization processing (Step S6), and returns to Step S1.

On the other hand, in the case of the data optimization ON, the transmission unit 2 performs data optimization processing (Step S5), and performs the transport optimization processing (Step S6). Then, the transmission unit 2 returns to Step S1.

Thus, in a case where the size of the received data is 0, the transmission unit 2 initializes the compression switching flag to true, and thus, the data compression can be restarted in a case where the type of transmission data is changed in a state where the data is not compressed.

Figure 11:
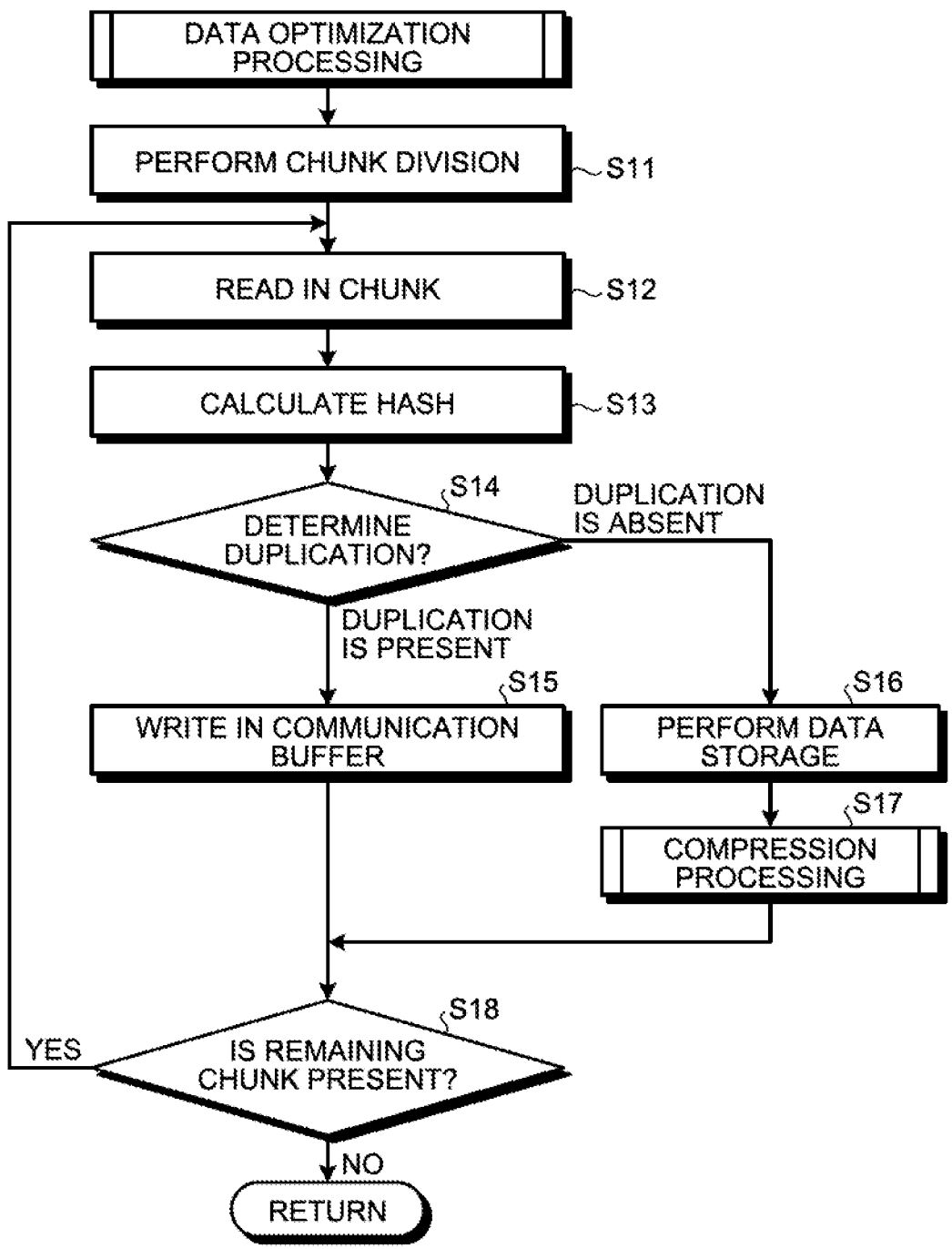
FIG. 11 is a flowchart illustrating a flow of data optimization processing.

Next, a flow of the data optimization processing will be described. FIG. 11 is a flowchart illustrating the flow of the data optimization processing. As illustrated in FIG. 11, the data optimization unit 24 performs chunk division (Step S11), and reads in the chunk (Step S12).

Then, the data optimization unit 24 calculates the hash (Step S13), searches the hash information storage unit 31, and determines the duplication with respect to the chunk (Step S14). As a result thereof, in a case where there is the duplication, the data optimization unit 24 writes the index based on the hash value in the communication buffer 25a (Step S15).

On the other hand, in a case where there is no duplication, the data optimization unit 24 performs data storage (Step S16). Here, in the data storage, the chunk is stored in the chunk storage unit 32, and the hash value, the data size, and the data position are stored in the hash information storage unit 31. Then, the data optimization unit 24 performs the compression processing (Step S17).

Then, the data optimization unit 24 determines whether or not there is the remaining chunk (Step S18), and in a case where there is the remaining chunk, the data optimization unit 24 returns to Step S12, and in a case where there is no remaining chunk, the data optimization unit 24 ends the data optimization processing.

Figure 12:
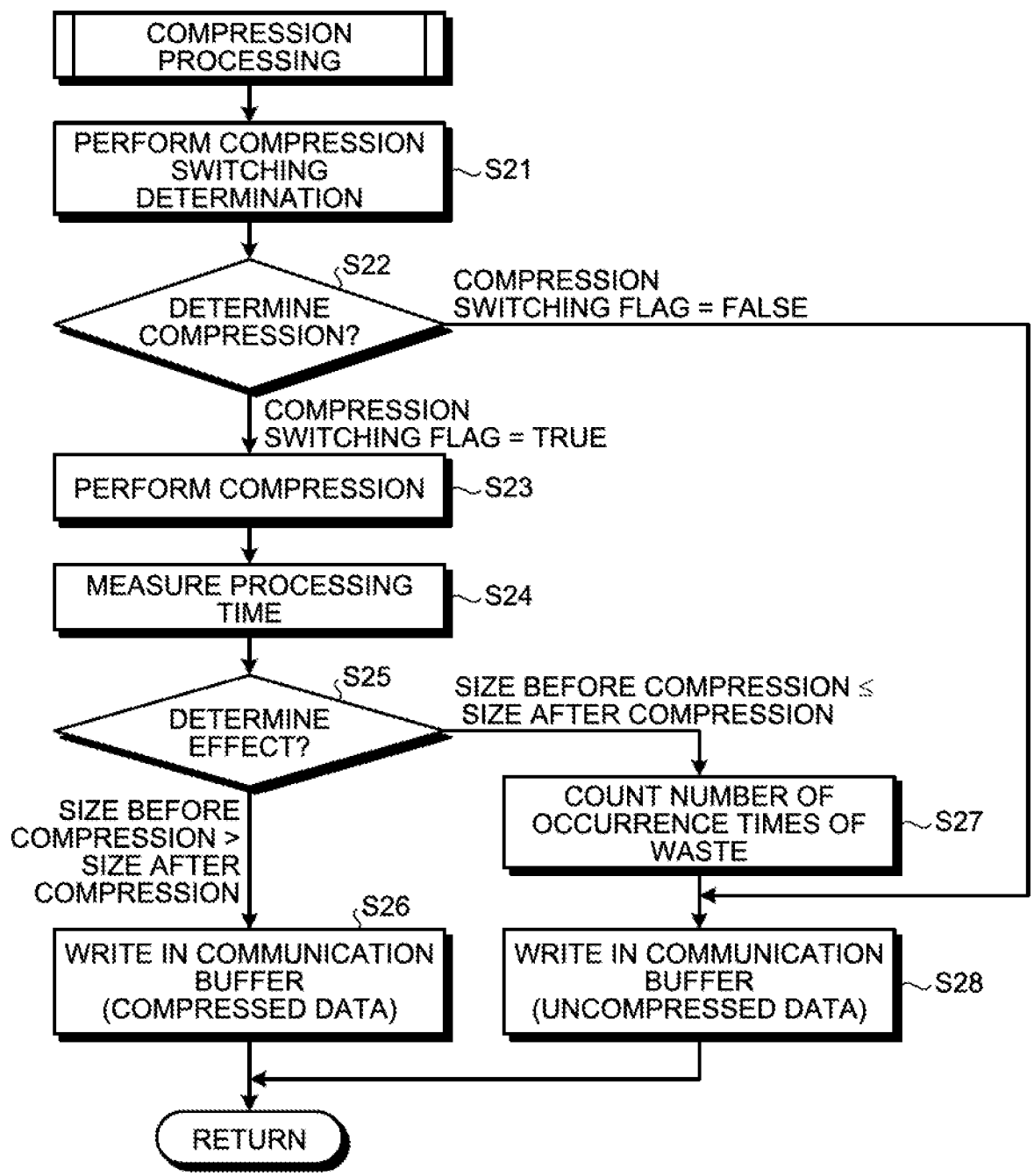
FIG. 12 is a flowchart illustrating a flow of the compression processing.

FIG. 12 is a flowchart illustrating a flow of the compression processing. As illustrated in FIG. 12, the data optimization unit 24 performs compression switching determination (Step S21). Here, in the compression switching determination, it is determined whether or not Average Processing Time×Number of Occurrence Times of Waste is greater than Threshold Value, and in a case where Average Processing Time×Number of Occurrence Times of Waste is greater than Threshold Value, the compression switching flag is set to false.

Then, the data optimization unit 24 determines the compression, on the basis of the compression switching flag (Step S22), and in a case where the compression switching flag is false, the data optimization unit 24 proceeds to Step S28. On the other hand, in a case where the compression switching flag is true, the data optimization unit 24 performs the compression of the chunk (Step S23), measures the processing time of the compression (Step S24), and updates the average processing time in the effect determination information storage unit 22.

Then, the data optimization unit 24 compares the sizes before and after the compression, and thus, performs compression effect determination (Step S25), and in a case where the size before the compression is larger than the size after the compression, the data optimization unit 24 writes the compressed data in the communication buffer 25a (Step S26). On the other hand, in a case where the size before the compression is not larger than the size after the compression, the data optimization unit 24 counts the number of occurrence times of waste (Step S27). Here, counting the number of occurrence times of waste indicates updating the number of occurrence times of waste in the effect determination information storage unit 22 by adding 1 thereto. Then, the data optimization unit 24 writes the uncompressed data in the communication buffer 25a (Step S28).

Thus, the data optimization unit 24 determines the presence or absence of the compression, on the basis of the compression switching flag, and thus, is capable of preventing the compression processing from being wastefully performed.

Figure 13:
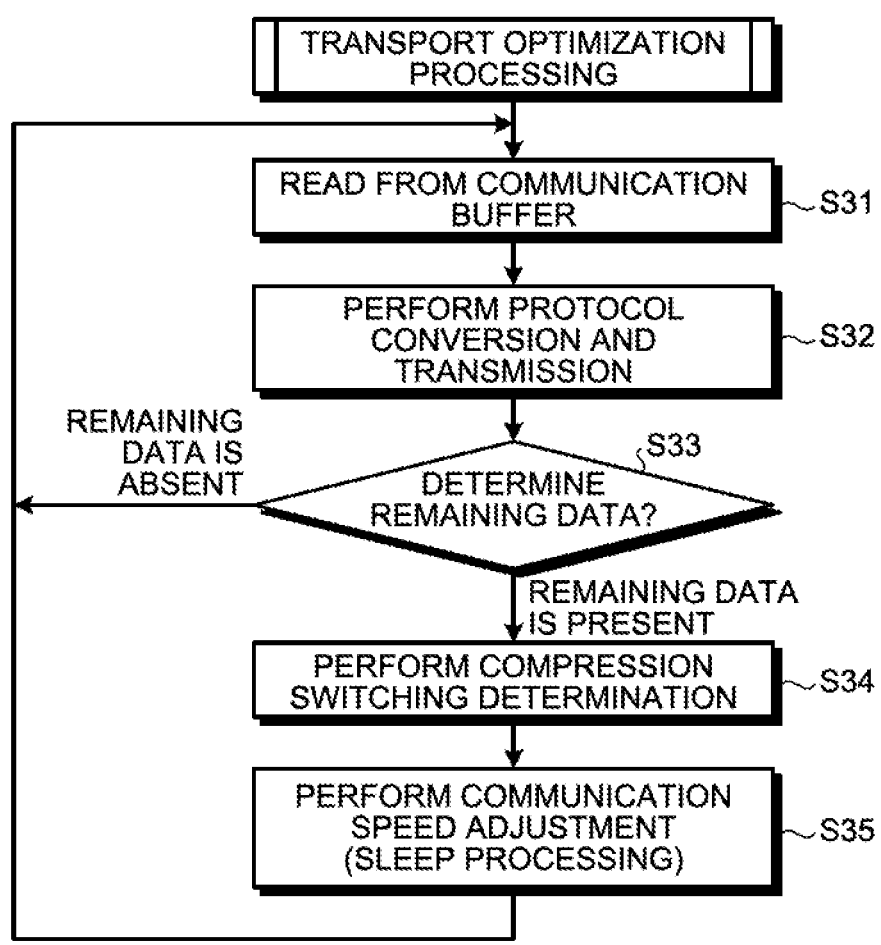
FIG. 13 is a flowchart illustrating a flow of transport optimization processing.

Next, a flow of the transport optimization processing will be described. FIG. 13 is a flowchart illustrating the flow of the transport optimization processing. As illustrated in FIG. 13, the transport optimization unit 25 reads from the communication buffer 25a (Step S31), and performs protocol conversion and transmission (Step S32).

Then, the transport optimization unit 25 determines remaining data in the communication buffer 25a is present (Step S33), and in a case where the remaining data is absent, the transport optimization unit 25 returns to Step S31, and in a case where the remaining data is present, the transport optimization unit 25 performs the compression switching determination (Step S34). Here, the compression switching determination determines whether or not the average processing time in the effect determination information storage unit 22 is shorter than Remaining Data Amount×Vacant Band, and in a case where the average processing time is shorter than Remaining Data Amount×Vacant Band, the compression switching flag is set to true, and in a case where the average processing time is not shorter than Remaining Data Amount×Vacant Band, the compression switching flag is set to false.

Then, the transport optimization unit 25 performs communication speed adjustment (Step S35), and returns to Step S31. Here, the communication speed adjustment indicates that sleep processing for a given length of time is performed in order to match a communication speed.

Thus, the transport optimization unit 25 sets the compression switching flag on the basis of whether or not the average processing time in the effect determination information storage unit 22 is shorter than Remaining Data Amount× Vacant Band, and thus, the data optimization unit 24 is capable of efficiently performing the compression.

As described above, in the embodiment, the data optimization unit 24 determines the duplication of the chunk, and compresses the chunk only in a case where there is no duplication of the chunk, and the transport optimization unit 25 transmits the compressed data. Therefore, the transmission unit 2 is capable of suppressing a processing load due to the data compression.

In addition, in the embodiment, in a case where there is the duplication of the chunk, the transport optimization unit 25 transmits the index, and thus, the transmission unit 2 is capable of reducing the data amount to be transmitted.

In addition, in the embodiment, the data optimization unit 24 determines whether or not Average Processing Time× Number of Occurrence Times of Waste is greater than Threshold Value, and in a case where Average Processing Time×Number of Occurrence Times of Waste is greater than Threshold Value, the compression switching flag is set to false, and the chunk is not compressed. Therefore, the transmission unit 2 is capable of preventing wasteful compression.

In addition, in the embodiment, in a case where the size of the received data is 0, the proxy unit 23 determines that the type of data is changed, and sets the compression switching flag to true, and thus, in a case where the type of data is changed, the data optimization unit 24 is capable of restarting the data compression. Therefore, the transmission unit 2 is capable of preventing a situation in which the compression is not performed in a case where the compression is valid, from occurring, and is capable of performing data transmission at a high speed.

In addition, in the embodiment, in a case where the average processing time in the effect determination information storage unit 22 is shorter than Remaining Data Amount×Vacant Band, the transport optimization unit 25 sets the compression switching flag to true, and thus, the data optimization unit 24 is capable of performing the compression by using a communication queuing time. Therefore, the transmission unit 2 is capable of efficiently performing the data compression.

Furthermore, in the embodiment, the transmission unit 2 has been described, but the configuration of the transmission unit 2 is realized by software, and thus, a data transmission program having the same function can be obtained. Therefore, a computer executing the data transmission program will be described. A data receive program having the function of the reception unit 4 is also executed by the same computer.

Figure 14:
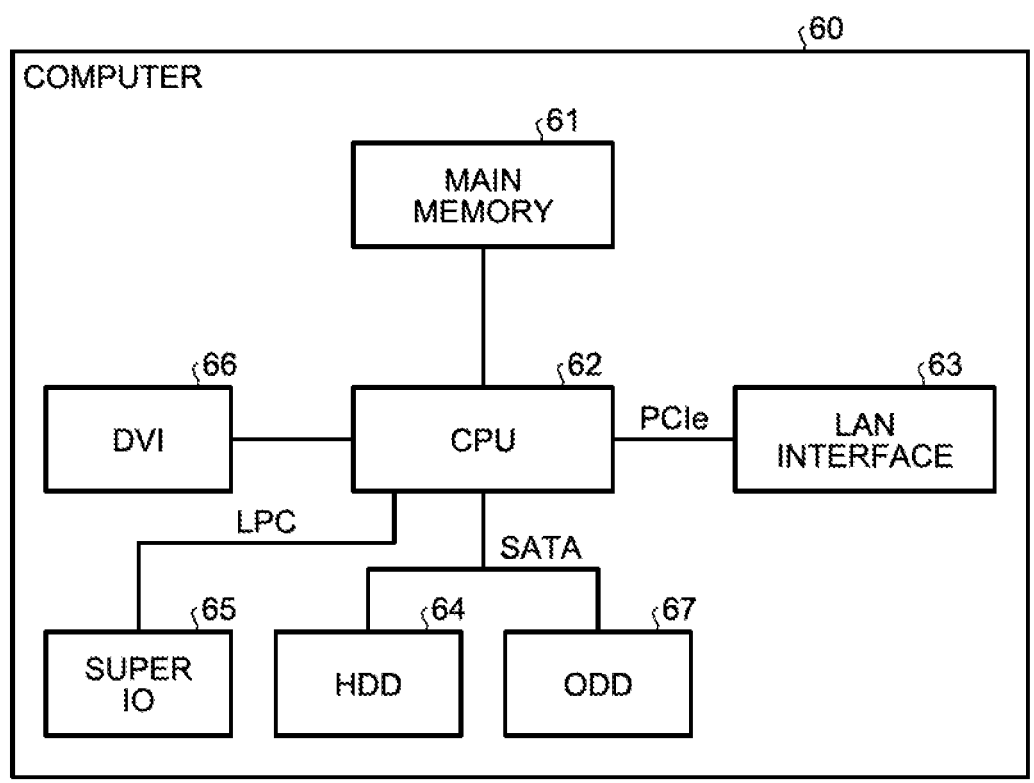
FIG. 14 is a diagram illustrating a hardware configuration of a computer executing a data transmission program according to the embodiment.

FIG. 14 is a diagram illustrating a hardware configuration of the computer executing the data transmission program according to the embodiment. As illustrated in FIG. 14, a computer 60 includes a main memory 61, a CPU 62, a local area network (LAN) interface 63, and a hard disk drive (HDD) 64. In addition, the computer 60 includes a super input output (IO) 65, a digital visual interface (DVI) 66, and an optical disk drive (ODD) 67.

The main memory 61 is a memory storing a program, an execution interim result of the program, or the like. The CPU 62 is a central processing unit executing the program by reading out the program from the main memory 61. The CPU 62 includes a chipset including a memory controller.

The LAN interface 63 is an interface for connecting the computer 60 to the other computer through a LAN. The HDD 64 is a disk device storing a program or data, and the super IO 65 is an interface for connecting an input device such as a mouse or a keyboard. The DVI 66 is an interface connecting a liquid crystal display device, and the ODD 67 is a device performing reading/writing of a DVD.

The LAN interface 63 is connected to the CPU 62 by PCI express (PCIe), and the HDD 64 and the ODD 67 are connected to the CPU 62 by serial advanced technology attachment (SATA). The super IO 65 is connected to the CPU 62 by low pin count (LPC).

Then, data transmission program executed in the computer 60, is stored in the DVD, is read out from the DVD by the ODD 67, and is installed in the computer 60. Alternatively, the data transmission program is stored in a database or the like of the other computer system which is connected through the LAN interface 63, is read out from the database, and is installed in the computer 60. Then, the installed data transmission program is stored in the HDD 64, is read out to the main memory 61, and is executed by the CPU 62.

In addition, in the embodiment, a case where the data is transmitted through the WAN 3, has been described, but the present invention is not limited thereto, and for example, can also be applied to a case where the data is transmitted by using other communication methods such as wireless communication.

It is possible to suppress a processing load due to data compression.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory computer-readable recording medium having stored therein a program that causes a computer to execute a process comprising:
   dividing acquired first data to generate second data having a size smaller than a size of the first data;
   determining whether or not the generated second data has been transmitted, with reference to a storage unit storing identification information of transmitted data;
   compressing the second data to generate third data having a size smaller than the size of the second data in a case in which the second data has not been transmitted; and
   transmitting the generated third data to a designated information processing device.

2. The non-transitory computer-readable recording medium according to claim 1, wherein the program causes the computer to execute the process further comprising:
   transmitting identification information of the second data to the information processing device in a case in which the second data has been transmitted.

3. The non-transitory computer-readable recording medium according to claim 1, wherein the program causes the computer to execute the process further comprising:
    transmitting the second data to the information processing device, on the basis of the number of times when a size of compressed data is not smaller than the size of the second data in a case in which the second data is compressed.

4. The non-transitory computer-readable recording medium according to claim 3, wherein the program causes the computer to execute the process further comprising:
    determining whether or not the type of the first data is changed; and
    compressing the second data to be transmitted to the information processing device in a case in which it is determined that a type of the first data is changed by.

5. The non-transitory computer-readable recording medium according to claim 3, wherein the program causes the computer to execute the process further comprising:
    compressing the second data to be transmitted to the information processing device, on the basis of a communication vacant band, a data amount accumulated in a communication buffer, and a time for performing compression processing.

6. A data transmission method of allowing a computer to execute a process comprising:
    dividing acquired first data to generate second data having a size smaller than a size of the first data;
    determining whether or not the generated second data has been transmitted, with reference to a storage unit storing identification information of transmitted data;
    compressing the second data to generate third data having a size smaller than the size of the second data in a case in which the second data has not been transmitted; and
    transmitting the generated third data to a designated information processing device.

7. A data transmission device comprising:
a memory; and
a processor coupled to the memory, wherein the processor executes a process comprising:
    dividing acquired first data to generate second data having a size smaller than a size of the first data;
    determining whether or not the generated second data has been transmitted, with reference to a storage unit storing identification information of transmitted data;
    compressing the second data to generate third data having a size smaller than the size of the second data in a case in which the second data has not been transmitted; and
    transmitting the generated third data to a designated information processing device.

* * * * *